United States Patent [19]

Yokotani et al.

[11] Patent Number: 4,711,862

[45] Date of Patent: Dec. 8, 1987

[54] DIELECTRIC CERAMIC COMPOSITIONS

[75] Inventors: Yoichiro Yokotani, Ibaraki; Junichi Kato; Masamitsu Nishida, both of Osaka; Syunichiro Kawashima, Nishinomiya; Hiromu Ouchi, Toyonaka, all of Japan

[73] Assignee: Matsushita Electric Industrial Co., Ltd., Kadoma, Japan

[21] Appl. No.: 813,521

[22] Filed: Dec. 26, 1985

[30] Foreign Application Priority Data

Dec. 27, 1984 [JP] Japan ................... 59-280317
Jan. 28, 1985 [JP] Japan ................... 60-13685
Feb. 19, 1985 [JP] Japan ................... 60-30910

[51] Int. Cl.$^4$ ............................ C04B 35/46
[52] U.S. Cl. ........................... 501/136; 501/134
[58] Field of Search ................... 501/134, 136

[56] References Cited

U.S. PATENT DOCUMENTS 4,078,938  3/1978  Yonezawa et al. ............. 501/134
4,265,668  5/1981  Fujiwara et al. ............... 501/136
4,450,240  5/1984  Miyamoto et al. .............. 501/136
4,542,107  9/1985  Kato et al. .................... 501/134

FOREIGN PATENT DOCUMENTS 60-33257  2/1985  Japan ....................... 501/134
60-33258  2/1985  Japan ....................... 501/134
60-46966  3/1985  Japan ....................... 501/134
60-50807  3/1985  Japan ....................... 501/134
60-50808  3/1985  Japan ....................... 501/134

Primary Examiner—Mark L. Bell
Attorney, Agent, or Firm—Cushman, Darby & Cushman

[57] ABSTRACT

A dielectric ceramic composition consisting essentially of:

$$PbTi_x(Mg_{1/3}Nb_{2/3})_y(Ni_{1/2}W_{1/2})_zO_3$$

wherein $x+y+z=1$, which allows low-temperature sintering and has a high dielectric constant, a low dielectric loss and a high specific resistivity.

3 Claims, 1 Drawing Figure

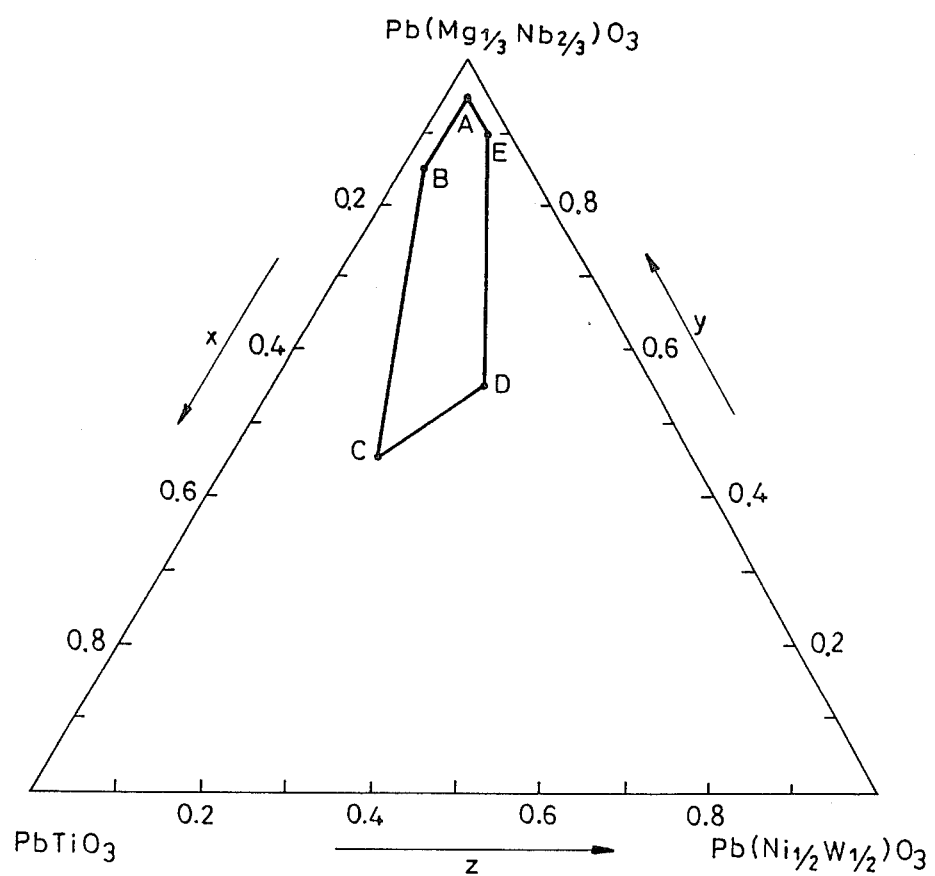

DIELECTRIC CERAMIC COMPOSITIONS

FIELD OF THE INVENTION AND RELATED ART STATEMENT

1. Field of the Invention

The present invention relates to dielectric ceramic compositions capable of sintering at low-temperature, exhibiting a high dielectric constant, low temperature coefficient of the dielectric constant and low dielectric loss, and being suitable for use in ceramic capacitors. 2. Description of the Related Art As promising ceramic compositions for the above-mentioned purpose, those essentially consisting of $BaTiO_3$ have been widely used as substance of high dielectric constant. The dielectric constant of this substance has a relatively high temperature coefficient of the dielectric constant, while in general, a dielectric substance which exhibits a low temperature coefficient of the dielectric constant has a relatively low dielectric constant.

The temperature coefficient of a ceramic capacitor is established or defined by JIS (Japanese Industrial Standard) or EIA (U.S. Electronics Industries Association) Standard. For example, the temperature coefficient of a dielectric constant adaptable to YF rating of JIS, which is approximately equivalent to Y5 V rating of EIA Standard, means that the temperature coefficient varies within a range of $+22$ to $-82\%$ for operating range of $-30°$ C. to $85°$ C. A dielectric material which exhibits a dielectric constant of 10,000, is adaptable to YF or Y5 V. However, $BaTiO_3$ system ceramics must be sintered at a very high temperature in the range of $1300°$ C. to $1400°$ C., so that where they are used as a dielectric substance of multilayer ceramic capacitors, expensive metals such as platinum or palladium which can stand such high sintering temperature must be used as internal electrodes of the capacitors, thereby obstructing cost reduction. Therefor there has still been a demand for dielectric ceramic materials which can be sintered at a temperature as low as below $1100°$ C. for enabling the use of relatively cheap metal such as silver-30% palladium for the internal electrodes.

U.S. Pat. No. 4,078,938 discloses binary system ceramic compositions of $Pb(Fe_{2/3}Nb_{1/3})O_3$-$Pb(Fe_{1/2}W_{1/2})O_3$ which can be sintered at a temperature as low as below $1000°$ C., and which exhibit a high dielectric constant of 20,000. However, the resultant ceramics have a relatively low specific resistivity.

U.S. Pat. No. 4,265,668 discloses binary system ceramic composition $PbTiO_3$-$Pb(Mg_{1/3}Nb_{2/3})O_3$, which exhibit a high dielectric constant of 20,000.

However, the ceramic compositions of this binary system must be sintered at a temperature range of $1100°$ C. to $1150°$ C.

U.S. Pat. No. 4,450,240 discloses ternary system ceramic compositions of $PbTiO_3$-$Pb(Ni_{1/3}Nb_{2/3})O_3$-$Pb(Mg_{1/2}W_{1/2})O_3$, which can be sintered at a temperature range of $900°$ C. to $1050°$ C. and exhibit a high electrical resistivity. However, the ceramics have a dielectric constant under 15,000.

SUMMARY AND OBJECT OF THE INVENTION

The object of the present invention is to provide a dielectric ceramic composition which can be sintered at a temperature as low as below $1100°$ C., and exhibits high dielectric constant and a high specific resistivity.

To attain the object, a ceramic composition of the present invention is a dielectric ceramic composition essentially comprising a substance represented by the formula.

$$PbTi_x(Mg_{1/3}Nb_{2/3})_y(Ni_{1/2}W_{1/2})_zO_3$$

wherein $x+y+z=1.00$.

Other mode of the present invention contains $MnO_2$, $Cr_2O_3$, $CoO$ And $MoO_3$ as an additive.

Still other mode of the invention contains $Pb(Mn_{1/3}Nb_{2/3})O_3 \cdot Pb(Mn_{1/2}Sb_{2/3})O_3$ as an additive.

These novel composition of the present invention can be sintered at a temperature in the range from $900°$ C. to $1100°$ C., and have a high dielectric constant up to 8,000, and low temperature coefficient of the dielectric constant which meet the YF rating of JIS or Y5 V rating of EIA standard, and further it has a high specific resistivity.

BRIEF DESCRIPTION OF THE DRAWING

The accompanying drawing is a composition diagram of $PbTiO_3$-$Pb(Mg_{1/3}Nb_{2/3})O_3$-$Pb(Ni_{1/2}W_{1/2})O_3$ ternary system, wherein the polygon ABCDE shows a range of composition of the ceramic composition in accordance with the present invention.

DETAILED DESCRIPTION OF THE INVENTION

The composition herein may be prepared in accordance with various well-known ceramic procedures.

EXAMPLE 1

The starting materials, viz. lead oxide (PbO), titanium oxide ($TiO_2$), niobium oxide($Nb_2O_5$), magnesium oxide(MgO), nickel oxide(NiO), tungsten oxide($WO_3$), all relatively pure grade, were initially mixed in a ball mill with distilled water and agate balls, for 17 hours. Thereafter the mixture was dried and then pressed into columns, and calcined at a temperature in the range of $750°$ C. to $880°$ C. for 2 hours in an aluminum crucibles. The substance thus obtained were wet ground in a ball mill, dried, mixed with polyvinyl alcohol as a binder solution, and then pressed into columns of about 13 mm in diameter and about 10 mm in length at a pressure of 700 $Kg/cm^2$. After buring out the binder at about $700°$ C., the pressed columns were put into a magnesia crucible and were sintered at a temperature in the range of $900°$ C. to $1100°$ C. for 2 hours. The sintered bodies were cut into disks of about 1 mm in thickness, and Cr-Au electrodes were attached on both surfaces of the disks by a method of vacuum evaporation.

Various properties of the ceramic disks thus obtained are shown in TABLE 1. The dielectric constant ($\epsilon$) and the dielectric loss (tan $\delta$) were measured at a frequency of 1 KHz and a voltage of 1 V at $20°$ C. The temperature coefficients of the dielectric constant were obtained by measuring the dielectric constants at temperatures in the range of $-25°$ C. to $85°$ C. and then calculations are made with reference to the dielectric constant at $20°$ C.

The sintering temperature is selected as the temperature wherein the density of the sintering columns has maximum.

The specific resistivity is measured at $20°$ C. under application of a D.C. voltage of 1000 V.

From TABLE 1 it is obvious that the ceramic compositions within the polygon ABCDE in the ternary system composition diagram of the drawing provide a

TABLE 1

| No. | Composition x | y | z | Sintering temperature (°C.) | $\epsilon$ 20° C. | tan δ 20° C. (× 10$^{-4}$) | Change of $\epsilon$ (%) (−25° C.) | (+85° C.) | Specific resistivity (Ω · cm) |
|---|---|---|---|---|---|---|---|---|---|
| 1 | 0.025 | 0.950 | 0.025 | 1090 | 10780 | 400 | −5.4 | −34.0 | 6.0 × 10$^{12}$ |
| 2* | 0.070 | 0.930 | 0.000 | 1150 | 21040 | 460 | −54.6 | −57.4 | 4.5 × 10$^{11}$ |
| 3 | 0.125 | 0.850 | 0.025 | 1090 | 17730 | 500 | −66.0 | −28.1 | 2.0 × 10$^{13}$ |
| 4* | 0.350 | 0.600 | 0.050 | 1100 | 3200 | 640 | −12.5 | +128.2 | 8.0 × 10$^{12}$ |
| 5 | 0.375 | 0.450 | 0.175 | 980 | 10210 | 500 | −74.3 | −11.6 | 5.0 × 10$^{12}$ |
| 6 | 0.200 | 0.700 | 0.100 | 1000 | 21350 | 410 | −60.0 | −54.0 | 1.0 × 10$^{13}$ |
| 7 | 0.250 | 0.550 | 0.200 | 980 | 12110 | 90 | −12.0 | −55.0 | 8.0 × 10$^{12}$ |
| 8 | 0.200 | 0.550 | 0.250 | 900 | 9850 | 45 | −8.1 | −60.3 | 2.5 × 10$^{12}$ |
| 9* | 0.100 | 0.600 | 0.300 | 900 | 4930 | 40 | +121.2 | −45.0 | 1.4 × 10$^{12}$ |
| 10 | 0.025 | 0.900 | 0.075 | 1030 | 11450 | 50 | −13.3 | −61.2 | 1.5 × 10$^{13}$ |
| 11* | 0.000 | 0.930 | 0.070 | 1030 | 9660 | 50 | −4.3 | −89.6 | 1.2 × 10$^{13}$ |
| 12* | 0.400 | 0.300 | 0.300 | 900 | 8760 | 102 | −12.6 | −45.3 | 1.0 × 10$^{12}$ |

Note 1: Basic compositions PbTi$_x$(Mg$_{\frac{1}{3}}$Nb$_{\frac{2}{3}}$)$_y$(Ni$_{\frac{1}{2}}$W$_{\frac{1}{2}}$)$_z$O$_3$
Note 2: Compositions of the Nos. with an asterisk (*) are outside the scope of the present invention.

high dielectric constant ($\epsilon$=9850-21350), high specific resistivity, low dielectric loss (tan $\delta \leq 500 \times 10$), low temperature coefficient of the dielectric constant which is adaptable to YF ranges rating of JIS and Y5 V rating of EIA Standard, and can be sintered below 1100° C., for which the points A, B, C, D and E of FIG. 1 are represented by the values of x, y and z as shown in TABLE 2.

The reasons for the limitations of values in TABLE 2 are as follows.

In case of the composition wherein proportions of z is smaller than 0.025 such as sample No. 2, the sintering temperature is higher than 1100a° C. Such compositions, which lie outside of line BC, DE and EA of the polygon ABCDE in the ternary system composition diagram as samples No. 4, 9 and 11, exhibit high temperature coefficients of dielectric constant. Such composition, which lies outside of line CD of the polygon ABCDE in the ternary system composition diagram, as sample No. 12 exhibits a dielectric constant which is lower than 9500.

EXAMPLE 2

The starting materials, viz. lead oxide(PbO), titanium oxide(TiO$_2$), niobium oxide(Nb$_2$O$_5$), magnesium oxide(MgO), nickel oxide(NiO), tungsten oxide(WO$_3$), manganese oxide(MnO$_2$), cromium oxide(Cr$_2$O$_3$), cobalt

TABLE 2

| | x | y | z |
|---|---|---|---|
| A | 0.025 | 0.950 | 0.025 |
| B | 0.125 | 0.850 | 0.025 |
| C | 0.375 | 0.450 | 0.175 |
| D | 0.200 | 0.550 | 0.250 |
| E | 0.025 | 0.900 | 0.075 | oxide(CoO) and molybdenum oxide(MoO$_3$), all relatively pure grade, were initially mixed in a ball mill with distilled water and agate balls, for 17 hours. Thereafter the mixture was dried and then pressed into columns, and calcined at a temperature in the range 750° C. to 880° C. for 2 hours in an aluminum crucibles. The substance thus obtained were wet ground in a ball mill, dried, mixed with polyvinyl alcohol as a binder solution, and then pressed into columns of about 13 mm in diameter and about 10 mm in length at a pressure of 700 Kg/cm$^2$. After buring out the binder at about 700° C., the pressed columns were put into a magnesia crucible and were sintered at a temperature in the range of 900° C. to 1100° C. for 2 hours. The sintered bodies were cut into disks of about 1 mm in thickness, and Cr-Au electrodes were attached on both surfaces of the disks by a method of vacuum evaporation.

Various properties of the ceramic disks thus obtained are shown in TABLE 3. The dielectric constant and the dielectric loss were measured at a frequency of 1 KHz and a voltage of 1 V at 20° C. The temperature coefficients of the dielectric constants were obtained by measuring a dielectric constant at temperatures in the range of −25° C. to 85° C. and calculated with reference to the dielectric constant at 20° C.

The sintering temperature is selected as the

TABLE 3

| No. | Composition x | y | z | Additive element | wt % | Sintering temperature (°C.) | $\epsilon$ 20° C. | tan δ 20° C. (× 10$^{-4}$) | Change of $\epsilon$ (%) (−25° C.) | (+85° C.) | Specific resistivity (Ω · cm) |
|---|---|---|---|---|---|---|---|---|---|---|---|
| 1# | 0.100 | 0.800 | 0.100 | — | — | 1050 | 13930 | 310 | +8.4 | −54.1 | 1.2 × 10$^{13}$ |
| 2 | 0.100 | 0.800 | 0.100 | MnO$_2$ | 0.05 | 1050 | 12230 | 122 | +7.3 | −48.3 | 1.2 × 10$^{13}$ |
| 3 | 0.100 | 0.800 | 0.100 | MnO$_2$ | 0.20 | 1040 | 12100 | 63 | +4.1 | −43.0 | 1.4 × 10$^{13}$ |
| 4* | 0.100 | 0.800 | 0.100 | MnO$_2$ | 1.00 | 1010 | 5440 | 210 | +5.1 | −21.3 | 2.0 × 10$^{12}$ |
| 5* | 0.100 | 0.800 | 0.100 | Cr$_2$O$_3$ | 0.01 | 1040 | 13320 | 250 | +8.1 | −54.0 | 1.1 × 10$^{13}$ |
| 6 | 0.100 | 0.800 | 0.100 | Cr$_2$O$_3$ | 0.03 | 1030 | 13030 | 170 | +5.1 | −45.3 | 1.0 × 10$^{13}$ |
| 7 | 0.100 | 0.800 | 0.100 | Cr$_2$O$_3$ | 0.15 | 1030 | 12420 | 102 | +4.1 | −45.4 | 7.5 × 10$^{12}$ |
| 8* | 0.100 | 0.800 | 0.100 | Cr$_2$O$_3$ | 0.70 | 1000 | 11450 | 340 | +7.1 | −21.9 | 2.5 × 10$^{11}$ |
| 9* | 0.100 | 0.800 | 0.100 | CoO | 0.02 | 1050 | 12980 | 280 | +7.5 | −49.3 | 1.0 × 10$^{13}$ |
| 10 | 0.100 | 0.800 | 0.100 | CoO | 0.40 | 1010 | 11390 | 175 | +4.3 | −40.6 | 1.0 × 10$^{13}$ |
| 11* | 0.100 | 0.800 | 0.100 | CoO | 0.90 | 1000 | 5480 | 100 | +12.5 | −21.8 | 3.5 × 10$^{11}$ |
| 12* | 0.100 | 0.800 | 0.100 | MoO$_3$ | 0.01 | 1050 | 13640 | 300 | +8.0 | −54.1 | 1.1 × 10$^{13}$ |
| 13 | 0.100 | 0.800 | 0.100 | MoO$_3$ | 0.40 | 1000 | 10960 | 180 | +12.5 | −43.7 | 8.5 × 10$^{12}$ |
| 14* | 0.100 | 0.800 | 0.100 | MoO$_3$ | 0.90 | 960 | 6490 | 250 | +13.2 | −31.7 | 8.0 × 10$^{11}$ |

TABLE 3-continued

| No. | Composition x | y | z | Additive element | wt % | Sintering temperature (°C.) | ε 20° C. | tan δ 20° C. (× 10⁻⁴) | Change of ε (%) (−25° C.) | (+85° C.) | Specific resistivity (Ω · cm) |
|---|---|---|---|---|---|---|---|---|---|---|---|
| 15 | 0.100 | 0.800 | 0.100 | MnO$_2$ | 0.10 | | | | | | |
|  |  |  |  | CoO | 0.05 | 1030 | 13340 | 100 | +6.3 | −51.0 | 1.0 × 10$^{13}$ |
| 16# | 0.200 | 0.700 | 0.100 | — | — | 1000 | 21350 | 410 | −6.3 | −54.0 | 1.0 × 10$^{13}$ |
| 17* | 0.200 | 0.700 | 0.100 | MnO$_2$ | 0.01 | 1000 | 21000 | 400 | −6.2 | −53.3 | 1.1 × 10$^{13}$ |
| 18 | 0.200 | 0.700 | 0.100 | MnO$_2$ | 0.03 | 1000 | 20000 | 200 | −6.0 | −51.4 | 1.5 × 10$^{13}$ |
| 19 | 0.200 | 0.700 | 0.100 | MnO$_2$ | 0.10 | 1000 | 19050 | 145 | −0.4 | −49.3 | 1.2 × 10$^{13}$ |
| 20 | 0.200 | 0.700 | 0.100 | MnO$_2$ | 0.60 | 1000 | 8430 | 73 | +1.5 | −39.3 | 5.0 × 10$^{12}$ |
| 21* | 0.200 | 0.700 | 0.100 | MnO$_2$ | 1.00 | 980 | 5430 | 150 | +7.8 | −21.3 | 8.0 × 10$^{11}$ |
| 22* | 0.200 | 0.700 | 0.100 | Cr$_2$O$_3$ | 0.02 | 1000 | 20640 | 315 | −5.3 | −51.3 | 1.4 × 10$^{13}$ |
| 23 | 0.200 | 0.700 | 0.100 | Cr$_2$O$_3$ | 0.30 | 950 | 14350 | 183 | +9.3 | −41.7 | 1.4 × 10$^{13}$ |
| 24* | 0.200 | 0.700 | 0.100 | Cr$_2$O$_3$ | 0.70 | 900 | 11430 | 235 | +15.3 | −30.8 | 7.0 × 10$^{11}$ |
| 25* | 0.200 | 0.700 | 0.100 | CoO | 0.01 | 1000 | 21430 | 315 | −8.3 | −53.2 | 1.1 × 10$^{13}$ |
| 26 | 0.200 | 0.700 | 0.100 | CoO | 0.25 | 980 | 20180 | 175 | −5.4 | −51.3 | 1.0 × 10$^{13}$ |
| 27* | 0.200 | 0.700 | 0.100 | CoO | 0.80 | 960 | 18930 | 220 | −4.3 | −50.6 | 3.0 × 10$^{11}$ |
| 28* | 0.200 | 0.700 | 0.100 | MoO$_3$ | 0.01 | 980 | 20740 | 325 | −6.0 | −53.1 | 8.5 × 10$^{13}$ |
| 29 | 0.200 | 0.700 | 0.100 | MoO$_3$ | 0.40 | 950 | 16340 | 163 | +3.1 | −50.4 | 1.1 × 10$^{13}$ |
| 30* | 0.200 | 0.700 | 0.100 | MoO$_3$ | 1.00 | 910 | 13320 | 230 | +5.1 | −48.3 | 4.0 × 10$^{11}$ |
| 31# | 0.250 | 0.550 | 0.200 | — | — | 980 | 12110 | 90 | +4.4 | −55.0 | 8.0 × 10$^{12}$ |
| 32 | 0.250 | 0.550 | 0.200 | MnO$_2$ | 0.08 | 970 | 10940 | 32 | +3.2 | −48.3 | 8.5 × 10$^{12}$ |
| 33 | 0.250 | 0.550 | 0.200 | MnO$_2$ | 0.40 | 950 | 8460 | 21 | +0.3 | −40.3 | 8.0 × 10$^{11}$ |
| 34* | 0.250 | 0.550 | 0.200 | MnO$_2$ | 0.80 | 940 | 5540 | 83 | −0.9 | −31.3 | 1.0 × 10$^{11}$ |
| 35* | 0.250 | 0.550 | 0.200 | Cr$_2$O$_3$ | 0.01 | 980 | 12330 | 87 | +4.4 | −55.3 | 8.0 × 10$^{12}$ |
| 36 | 0.250 | 0.550 | 0.200 | Cr$_2$O$_3$ | 0.03 | 980 | 12120 | 74 | +4.0 | −51.3 | 1.0 × 10$^{13}$ |
| 37 | 0.250 | 0.550 | 0.200 | Cr$_2$O$_3$ | 0.15 | 970 | 10770 | 40 | +3.1 | −43.3 | 1.3 × 10$^{13}$ |
| 38 | 0.250 | 0.550 | 0.200 | Cr$_2$O$_3$ | 0.50 | 950 | 8960 | 85 | +1.0 | −38.8 | 4.5 × 10$^{12}$ |
| 39* | 0.250 | 0.550 | 0.200 | Cr$_2$O$_3$ | 1.00 | 930 | 5140 | 250 | −3.5 | −31.5 | 2.0 × 10$^{11}$ |
| 40 | 0.250 | 0.550 | 0.200 | CoO | 0.30 | 960 | 11540 | 174 | −3.1 | −42.3 | 8.0 × 10$^{12}$ |
| 41 | 0.250 | 0.550 | 0.200 | CoO | 0.50 | 960 | 10430 | 184 | −6.3 | −38.4 | 9.0 × 10$^{11}$ |
| 42* | 0.250 | 0.550 | 0.200 | CoO | 0.80 | 970 | 9440 | 230 | −7.4 | −36.5 | 1.5 × 10$^{10}$ |
| 43* | 0.250 | 0.550 | 0.200 | MoO$_3$ | 0.02 | 980 | 11340 | 210 | +3.1 | −53.2 | 8.5 × 10$^{12}$ |
| 44 | 0.250 | 0.550 | 0.200 | MoO$_3$ | 0.15 | 960 | 10420 | 152 | +7.3 | −48.1 | 1.2 × 10$^{12}$ |
| 45* | 0.250 | 0.550 | 0.200 | MoO$_3$ | 0.80 | 960 | 5110 | 135 | +4.3 | −31.2 | 7.0 × 10$^{11}$ |

Note 1: Basic compositions PbTi$_x$(Mg$_{\frac{1}{3}}$Nb$_{\frac{2}{3}}$)$_y$(Ni$_{\frac{1}{2}}$W$_{\frac{1}{2}}$)$_z$O$_3$
Note 2: Compositions of the Nos. with asterisk (*) are outside the scope of the present invention, with sharp (#) are included in the claim 1.

temperature wherein the density of the sintering columns has maximum.

The specific resistivity is measured at 20° C. under application of a D.C. voltage of 1000 V.

From TABLE 3 it is obvious that the ceramic compositions within the polygon ABCDE in the ternary system composition diagram of the drawing and containing at least one element selected from the group consisting of Mn, Cr, Co and Mo in an amount in total equivalent 0.03 to 0.06 weight % of respective oxides (MnO$_2$, Cr$_2$O$_3$, CoO and MoO$_3$) exhibit low dielectric loss at the room temperature as compared with that of composition with no addition and exhibit still high dielectric constant even with low sintering temperature.

The reasons for the limitations in TABLE 3 are as follows.

If content of MoO$_2$, Cr$_2$O$_3$, CoO and MoO$_3$ in total is smaller than 0.03 weight %, the dielectric loss at the room temperature is not improved. When the content in total is larger than 0.60 weight %, the dielectric loss becomes larger and specific resistivity becomes smaller.

EXAMPLE 3

The starting materials, viz. lead oxide(PbO), titanium oxide(TiO$_2$), niobium oxide(Nb$_2$O$_5$), magnesium oxide(MgO), nickel oxide(NiO), tungsten oxide(WO$_3$), manganese oxide(MnO$_2$) and antimony oxide(Sb$_2$O$_5$), all relatively pure grade, were initially mixed in a ball mill with distilled water and agate balls, for 17 hours. Thereafter the mixture was dried and then pressed into columns, and calcined at a temperature in the range 750° C. to 880a° C. for 2 hours in an aluminum crucibles. The substance thus obtained were wet ground in a ball mill, dried, mixed with polyvinyl alcohol as a binder solution, and then pressed into columns of about 13 mm in diameter and about 10 mm in length at a pressure of 700 Kg/cm$^2$. After buring out the binder at about 700° C., the pressed columns were put into a magnesia crucible and were sintered at a temperature in the range of 900° C. ato 1100° C. for 2 hours. The sintered bodies were cut into disks of about 1 mm in thickness, and Cr-Au electrodes were attached on both surfaces of the disks by a method of vacuum evaporation.

Various properties of the ceramic disks thus obtained are shown in TABLE 4. The dielectric constant and the dielectric loss were measured at a frequency of 1 KHz and a voltage of 1 V at 20° C. The temperature coefficients of the dielectric constants were obtained by measuring a dielectric constant at temperatures in the range of −25° C. to 85° C. and calculated with reference to the dielectric constant at 20° C.

TABLE 4

| No. | Composition x | y | z | Additive element | wt % | Sintering temperature (°C.) | ε 20° C. | tan δ 20° C. (× 10⁻⁴) | Change of ε (%) (−25° C.) | (+85° C.) | Specific resistivity (Ω · cm) |
|---|---|---|---|---|---|---|---|---|---|---|---|
| 1# | 0.100 | 0.800 | 0.100 | — | — | 1050 | 13930 | 310 | +8.4 | −54.1 | 1.2 × 10$^{13}$ |
| 2* | 0.100 | 0.800 | 0.100 | MnNb | 0.20 | 1040 | 13010 | 220 | +3.1 | −52.3 | 1.0 × 10$^{13}$ |

TABLE 4-continued

| No. | Composition x | y | z | Additive element | wt % | Sintering temperature (°C.) | $\epsilon$ 20° C. | tan δ 20° C. ($\times 10^{-4}$) | Change of $\epsilon$ (%) (−25° C.) | (+85° C.) | Specific resistivity ($\Omega \cdot$ cm) |
|---|---|---|---|---|---|---|---|---|---|---|---|
| 3 | 0.100 | 0.800 | 0.100 | MnNb | 0.80 | 1020 | 12150 | 107 | +2.1 | −50.1 | $8.0 \times 10^{12}$ |
| 4 | 0.100 | 0.800 | 0.100 | MnNb | 2.00 | 1000 | 10840 | 102 | −2.1 | −48.1 | $8.5 \times 10^{11}$ |
| 5* | 0.100 | 0.800 | 0.100 | MnNb | 3.00 | 1000 | 9410 | 215 | −2.1 | −38.2 | $2.5 \times 10^{11}$ |
| 6* | 0.100 | 0.800 | 0.100 | MnW | 0.10 | 1040 | 13390 | 280 | +7.1 | −53.2 | $1.1 \times 10^{13}$ |
| 7 | 0.100 | 0.800 | 0.100 | MnW | 0.50 | 1030 | 12840 | 147 | +5.1 | −50.4 | $8.0 \times 10^{12}$ |
| 8 | 0.100 | 0.800 | 0.100 | MnW | 1.00 | 1000 | 10430 | 78 | +2.1 | −46.3 | $8.0 \times 10^{12}$ |
| 9 | 0.100 | 0.800 | 0.100 | MnW | 2.50 | 960 | 6440 | 109 | −3.5 | −38.4 | $2.5 \times 10^{12}$ |
| 10* | 0.100 | 0.800 | 0.100 | MnW | 4.00 | 940 | 3180 | 215 | −5.3 | −30.6 | $7.5 \times 10^{11}$ |
| 11* | 0.100 | 0.800 | 0.100 | MnSb | 0.20 | 1040 | 13380 | 254 | +7.1 | −53.1 | $1.4 \times 10^{13}$ |
| 12 | 0.100 | 0.800 | 0.100 | MnSb | 0.50 | 1040 | 12860 | 200 | +4.3 | −50.4 | $1.2 \times 10^{13}$ |
| 13 | 0.100 | 0.800 | 0.100 | MnSb | 1.00 | 1030 | 11430 | 63 | +1.3 | −43.7 | $1.2 \times 10^{12}$ |
| 14* | 0.100 | 0.800 | 0.100 | MnSb | 3.00 | 1000 | 7420 | 212 | −3.4 | −39.8 | $5.0 \times 10^{11}$ |
| 15 | 0.100 | 0.800 | 0.100 | MnNb MnW | 1.00 0.50 | 1000 | 10840 | 174 | −5.3 | −48.3 | $1.2 \times 10^{13}$ |
| 16# | 0.200 | 0.700 | 0.100 | — | — | 1000 | 21350 | 410 | −6.3 | −54.0 | $1.0 \times 10^{13}$ |
| 17* | 0.200 | 0.700 | 0.100 | MnNb | 0.30 | 1000 | 20140 | 280 | −5.1 | −53.1 | $1.2 \times 10^{13}$ |
| 18 | 0.200 | 0.700 | 0.100 | MnNb | 0.50 | 1000 | 18430 | 172 | −3.5 | −50.6 | $1.0 \times 10^{13}$ |
| 19 | 0.200 | 0.700 | 0.100 | MnNb | 1.30 | 1000 | 16430 | 74 | +0.8 | −48.2 | $8.0 \times 10^{12}$ |
| 20 | 0.200 | 0.700 | 0.100 | MnNb | 2.50 | 1000 | 11130 | 168 | +4.3 | −39.2 | $6.0 \times 10^{12}$ |
| 21* | 0.200 | 0.700 | 0.100 | MnNb | 5.00 | 980 | 6990 | 254 | +5.3 | −36.4 | $1.0 \times 10^{11}$ |
| 22* | 0.200 | 0.700 | 0.100 | MnW | 0.10 | 1000 | 20410 | 313 | −3.1 | −50.1 | $1.0 \times 10^{13}$ |
| 23 | 0.200 | 0.700 | 0.100 | MnW | 1.00 | 990 | 16890 | 174 | −3.1 | −50.1 | $8.0 \times 10^{12}$ |
| 24 | 0.200 | 0.700 | 0.100 | MnW | 2.00 | 980 | 13380 | 184 | +0.6 | −43.2 | $5.0 \times 10^{12}$ |
| 25* | 0.200 | 0.700 | 0.100 | MnW | 5.00 | 940 | 8190 | 205 | +3.2 | −39.3 | $2.0 \times 10^{11}$ |
| 26* | 0.200 | 0.700 | 0.100 | MnSb | 0.10 | 1000 | 20030 | 305 | −5.1 | −53.1 | $1.5 \times 10^{13}$ |
| 27 | 0.200 | 0.700 | 0.100 | MnSb | 0.50 | 1000 | 18630 | 200 | −3.5 | −51.2 | $1.5 \times 10^{13}$ |
| 28 | 0.200 | 0.700 | 0.100 | MnSb | 1.00 | 1000 | 13340 | 106 | +0.6 | −43.9 | $1.0 \times 10^{13}$ |
| 29 | 0.200 | 0.700 | 0.100 | MnSb | 2.50 | 1000 | 10140 | 184 | +4.3 | −39.3 | $4.0 \times 10^{12}$ |
| 30* | 0.200 | 0.700 | 0.100 | MnSb | 5.00 | 980 | 8430 | 213 | +4.9 | −39.4 | $1.0 \times 10^{11}$ |
| 31# | 0.250 | 0.550 | 0.200 | — | — | 980 | 12110 | 90 | +4.4 | −55.0 | $8.0 \times 10^{12}$ |
| 32* | 0.250 | 0.550 | 0.200 | MnNb | 0.30 | 980 | 11980 | 85 | +3.1 | −51.3 | $9.0 \times 10^{12}$ |
| 33 | 0.250 | 0.550 | 0.200 | MnNb | 0.50 | 980 | 10830 | 35 | +2.1 | −49.3 | $8.0 \times 10^{12}$ |
| 34 | 0.250 | 0.550 | 0.200 | MnNb | 1.00 | 980 | 10400 | 65 | +0.3 | −45.3 | $7.0 \times 10^{12}$ |
| 35 | 0.250 | 0.550 | 0.200 | MnNb | 2.50 | 980 | 9125 | 168 | +5.4 | −39.8 | $5.0 \times 10^{12}$ |
| 36* | 0.250 | 0.550 | 0.200 | MnNb | 5.00 | 960 | 6050 | 256 | +6.9 | −37.4 | $1.0 \times 10^{11}$ |
| 37* | 0.250 | 0.550 | 0.200 | MnW | 0.30 | 980 | 11480 | 84 | +3.3 | −53.9 | $1.0 \times 10^{13}$ |
| 38 | 0.250 | 0.550 | 0.200 | MnW | 1.50 | 960 | 10350 | 45 | +1.2 | −49.8 | $7.5 \times 10^{12}$ |
| 39* | 0.250 | 0.550 | 0.200 | MnW | 3.00 | 960 | 9420 | 212 | −4.1 | −36.3 | $4.5 \times 10^{12}$ |
| 40* | 0.250 | 0.550 | 0.200 | MnSb | 0.30 | 980 | 11490 | 90 | +4.3 | −52.0 | $9.0 \times 10^{12}$ |
| 41 | 0.250 | 0.550 | 0.200 | MnSb | 1.00 | 980 | 10640 | 122 | +4.1 | −50.6 | $9.0 \times 10^{12}$ |
| 42 | 0.250 | 0.550 | 0.200 | MnSb | 2.00 | 980 | 7130 | 178 | +2.1 | −46.3 | $7.5 \times 10^{12}$ |
| 43* | 0.250 | 0.550 | 0.200 | MnSb | 5.00 | 980 | 4130 | 105 | +4.0 | −50.1 | $5.0 \times 10^{11}$ |
| 44 | 0.250 | 0.550 | 0.200 | MnNb MnW | 0.50 0.50 | 980 | 11430 | 105 | +4.0 | −50.1 | $7.0 \times 10^{12}$ |
| 45 | 0.250 | 0.550 | 0.200 | MnNb MnSb | 0.50 1.00 | 980 | 11580 | 132 | +1.4 | −42.3 | $5.0 \times 10^{12}$ |

Note 1: Basic compositions PbTi$_x$(Mg$_{\frac{1}{3}}$Nb$_{\frac{2}{3}}$)$_y$(Ni$_{\frac{1}{2}}$W$_{\frac{1}{2}}$)$_z$O$_3$
Note 2: Compositions of the Nos. with asterisk (*) are outside the scope of the present invention with sharp (#) are included in the claim 1.
Note 3: Additive elements MnNb means Pb(Mn$_{\frac{1}{3}}$Nb$_{\frac{2}{3}}$)O$_3$, MnW means Pb(Mn$_{\frac{1}{2}}$W$_{\frac{1}{2}}$)O$_3$ and MnSb means Pb(Mn$_{\frac{1}{3}}$Sb$_{\frac{2}{3}}$)O$_3$.

The sintering temperature is selected as the temperature wherein the density of the sintering columns has maximum.

The specific resistivity is measured at 20° C. under application a D.C. voltage of 1000 V.

From TABLE 4 it is obvious that the ceramic compositions within the polygon ABCDE in the ternary system composition diagram of the drawing and containing at least one element selected from the group consisting of Pb(Mn$_{1/3}$Nb$_{2/3}$)O$_3$, Pb(Mn$_{1/2}$W$_{1/2}$)O$_3$ and Pb(Mn$_{1/3}$Sb$_{2/3}$)O$_3$ in an amount in total quantity equivalent 0.50 to 2.50 weight % exhibit low dielectric loss at the room temperature as compared with that of composition with no addition and exhibit still high dielectric constant along with low sintering temperature.

The reasons for the limitations in TABLE 4 are as follows.

If contents of Pb(Mn$_{1/3}$Nb$_{2/3}$)O$_3$, Pb(Mn$_{1/2}$W$_{1/2}$) and Pb(Mn$_{1/3}$Sb$_{2/3}$)O$_3$ in total is smaller than 0.50 weight %, the dielectric loss at the room temperature is not improved. When the content in total is larger than 2.5 weight %, the dielectric loss becomes larger and specific resistivity becomes smaller.

As apparent from these Examples 1 to 4, the ternary ceramic compositions of the present invention have low sintering temperature below 1100° C., so that relatively cheap metal or alloy such as silver-30% palladium can be employed as internal electrodes of multilayer ceramic capacitors, and the durability of furnace used for sintering use may be extended and electric power for sintering may be lowered. Moreover, the ceramic compositions according to the present invention exhibit high dielectric constant together with high specific resistivity, low temperature coefficient of the dielectric constant and low dielectric loss. Therefor, the ceramic composition in accordance with the present invention are suitable for use in ceramic capacitors.

It will be evident that the starting materials to be used in the present invention are not limited to those used in the above-mentioned examples. Other oxide or compounds which are easily decomposed at elevated temperature may be used in place of the starting materials of the above examples.

What is claimed is:

1. A ceramic compositions comprising a substance represented by the formula $$PbTi_x(Mg_{1/3}Nb_{2/3})_y(Ni_{1/2}W_{1/2})_zO_3$$

wherein $x+y+z=1$ and the values of x,y and z fall within the ranges represented by the polygon ABCDE in the accompanying composition diagram of $PbTiO_3$-$Pb(Mg_{1/3}Nb_{2/3})O_3$-$Pb(Ni_{1/2}W_{1/2})O_3$ ternary system.

2. A ceramic composition comprising a substance represented by the formula $$PbTi_x(Mg_{1/3}Nb_{2/3})_y(Ni_{1/2}W_{1/2})_zO_3$$

wherein $x+y+z=1$ and the values of x, y and z fall within the ranges represented by the polygon ABCDE in the accompanying composition diagram of $PbTiO_3$-$Pb(Mg_{1/3}Nb_{2/3})O_3$-$Pb(Ni_{1/2}W_{1/2})O_3$ ternary system and at least one element selected from the group consisting of Mn, Cr, Co and Mo in an amount in total equivalent to from 0.03 to 0.60 weight percent of respective oxides $MnO_2$, $Cr_2O_3$, CoO and $MoO_3$.

3. A ceramic composition comprising a substance represented by the formula $$PbTi_x(Mg_{1/3}Nb_{2/3})_y(Ni_{1/2}W_{1/2})_zO_3$$

wherein $x+y+z=1$ and the values of x, y and z fall within the ranges represented by the polygon ABCDE in the accompanying composition diagram of $PbTiO_3$-$Pb(Mg_{1/3}Nb_{2/3})O_3$-$Pb(Ni_{1/2}W_{1/2})O_3$ ternary system and at least one element selected from the group consisting of $Pb(Mn_{1/3}Nb_{2/3})O_3$, $Pb(Mn_{1/2}W_{1/2})O_3$ and $Pb(Mn_{1/3}Sb_{2/3})O_3$ in an amount in total equivalent to from 0.50 to 2.50 weight percent.

* * * * *